Aug. 18, 1953 G. L. PEARSON 2,649,569

SEMICONDUCTOR MAGNETORESISTIVE DEVICE

Filed Sept. 28, 1950 3 Sheets-Sheet 1

INVENTOR
G. L. PEARSON

BY J. Guenther

ATTORNEY

Aug. 18, 1953 G. L. PEARSON 2,649,569

SEMICONDUCTOR MAGNETORESISTIVE DEVICE

Filed Sept. 28, 1950 3 Sheets-Sheet 2

LEGEND:

H DIRECTION

○ – 100
□ – 010
● – 110
× – 001
△ – 1̄10

INVENTOR
G. L. PEARSON
BY R. J. Guenther
ATTORNEY

SEMICONDUCTOR MAGNETORESISTIVE DEVICE

Filed Sept. 28, 1950 3 Sheets-Sheet 3

INVENTOR
G. L. PEARSON
BY [signature]
ATTORNEY

Patented Aug. 18, 1953 2,649,569

UNITED STATES PATENT OFFICE 2,649,569

SEMICONDUCTOR MAGNETORESISTIVE DEVICE

Gerald L. Pearson, Millington, N. J., assignor to Bell Telephone Laboratories, Incorporated, New York, N. Y., a corporation of New York Application September 28, 1950, Serial No. 187,317

7 Claims. (Cl. 324—46)

This invention relates to semiconductor magnetoresistive devices and more particularly to such devices including a body of germanium.

It is known in the art that the resistance of certain semiconductive materials may be varied by subjecting the material to a magnetic field, and it has been proposed heretofore that this phenomenon might be utilized to effect measurement of magnetic field strengths. However, in such proposed devices, the sensitivity is low and the relation between changes in resistance and variations in magnetic field strength is not uniform.

One general object of this invention is to improve the performance characteristics of semiconductor magnetoresistive devices.

More specific objects of this invention are to increase the sensitivity of magnetoresistive devices and to enable attainment of uniform and reproducible resistance vs. magnetic field strength characteristics for such devices.

In one illustrative embodiment of this invention, a magnetoresistive device comprises a body of germanium having a pair of electrodes or terminals at spaced points thereon and a circuit including a source for passing a current between the terminals and an indicating device for measuring the voltage across the terminals. The body is adapted for mounting or insertion in a magnetic field.

It has been found that the magnetoresistive properties of a germanium body are dependent largely upon the crystalline structure of the body and that unique correlations obtain between the magnetoresistance effects and the direction of the magnetic field relative to certain axes of the body. More specifically, it has been found that particularly large magnetoresistive effects are realizable when the body is composed of a single crystal of germanium and, further, when a particular orientation of the magnetic field relative to the axes of the single crystal obtains.

One feature of this invention pertains to the utilization of single crystal bodies of germanium in magnetoresistive devices.

Another feature of this invention relates to unique orientation of the body relative to the magnetic field.

In one specific embodiment of this invention, utilizable to particular advantage in flux meters, the aforementioned electrodes or terminals engage a single crystal at spaced points on the 100 axis of the crystal and a constant current is passed between these terminals. The crystal is inserted into a magnetic field the lines of force of which are substantially parallel to the 100 axis of the crystal. The change in the crystal resistance with magnetic field strength is uniform over a wide range of field strengths. Specifically, for a constant current, the increase in voltage between the terminals due to the effect of the magnetic field is substantially proportional to the square of the field.

In another specific embodiment of the invention, the crystal is mounted for rotation in a magnetic field, about an axis normal to the field. Upon rotation of the crystal about this axis, the voltage between the terminals varies substantially sinusoidally, passing through two cycles for each revolution.

The crystals utilized in devices constructed in accordance with this invention may be of either N or P conductivity type and may be cut from bodies or ingots produced in the manner disclosed in the application Serial No. 138,354, filed January 13, 1950 of J. B. Little and G. K. Teal.

The invention and the above-noted and other features thereof will be understood more clearly and fully from the following detailed description with reference to the accompanying drawing in which.

Figure 1:
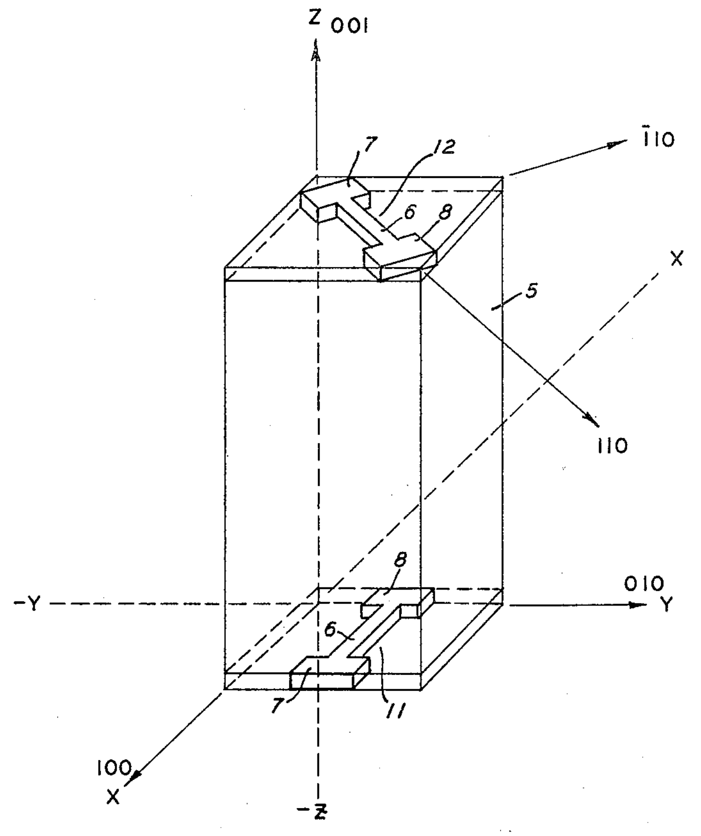
Fig. 1 is a diagram illustrating the orientation of two single crystal bodies utilizable in devices constructed in accordance with this invention, relative to coordinate axes hereinafter described.

Referring now to Fig. 1, the coordinate system therein shown is a three-dimensional rectangular one wherein 100 represents the X crystal axis or direction, 010 represents the Y direction, and 001 the Z direction.

Referring now to Fig. 1 of the drawing, there is shown therein an elongated single crystal 5 of square cross-section, of germanium, which may be obtained from an ingot prepared in a manner disclosed in an application hereinabove identified as by grinding the ingot with a suitable abrasive and so that the edges of the prism are parallel to the X, Y and Z crystalline axes as determined by X-rays in ways known in the art. The crystalline structure is cubic throughout and of the diamond-lattice type. Individual bodies of single crystal structure may be cut from the prism with their physical axes in any desired relation to the crystalline axes. Two such bodies are illustrated at 11 and 12 in Fig. 1, the former having its length parallel to the X crystal axis and designated as a 100 crystal and the latter having its length at 45 degrees to the X and Y axes and designated as 110 crystal.

Each of the single crystal bodies 11 and 12 has an intermediate portion 6 and enlarged end portions 7 and 8 to which ohmic connections, not shown, may be made as by rhodium platings applied by electrolysis.

In typical bodies, the intermediate portion 6 may be 0.5 centimeter long and 0.025 centimeter wide and thick. To facilitate handling thereof the bodies 11 and 12 may be mounted upon substrata of insulating material, for example sheets of glass.

The resistance of a single crystal body such as 11 or 12 immersed in a magnetic field is a function of, inter alia, the field strength and the direction of the field relative to the crystalline axes. Typical characteristics illustrating the relationships involved are depicted in Figs. 2, 3, 4 and 5 for two different temperatures, 77 and 300 degrees Kelvin, in each figure, the temperatures being indicated opposite the curves corresponding thereto. In these figures, the characteristics portrayed are for bodies, such as 11 and 12, with current passing therethrough lengthwise of the body in each case as indicated by the legend "I direction." In Figs. 2 to 5 inclusive, the abscissa are field strength in gauss and the ordinates are in the ratio $$\frac{\delta\rho}{\rho}$$

where $\rho$ is the resistance of the body when no magnetic flux is passing through it and $\delta\rho$ is the change is resistance when the magnetic field is present.

Figure 2:
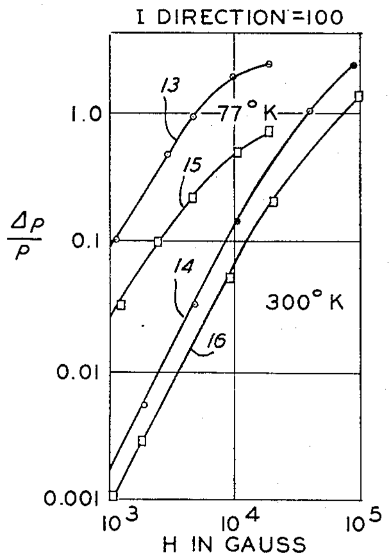
Figs. 2 and 3 illustrate the change of resistance of N-type semiconductive single germanium crystals with respect to variations of the strength of the magnetic field wherein they are positioned.

The characteristics presented in Fig. 2 are for a single crystal N-type body cut in the X or 100 coordinate, that is, a body such as 11 in Fig. 1 as indicated by the legend. The curves 13 and 14 in Fig. 2 represent the change in resistance vs. magnetic flux strength relationship when the magnetic field is parallel to the X or 100 direction, whereas curves 15 and 16 present this relationship when the magnetic field threading the body is in the Y or 010 direction.

Figure 3:
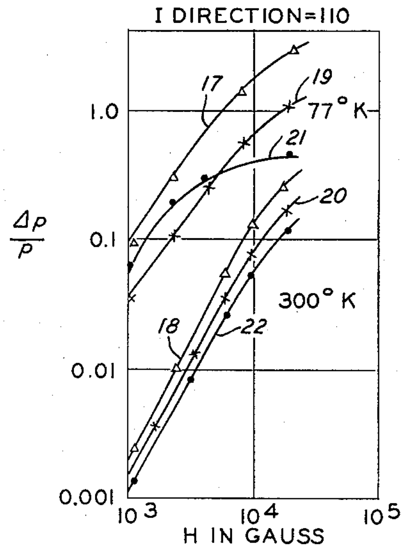

In Fig. 3 the relationship above-mentioned is illustrated for a body such as the body 12 in Fig. 1 having its length parallel to the 110 axis. For curves 17 and 18 the magnetic flux was in the X [—Y] or 1$\bar{1}$0 direction; curves 19 and 20 are for the case when the magnetic flux is in the Z or 001 direction, and curves 21 and 22 are for the case where the magnetic flux is in the 110 direction.

Figure 4:
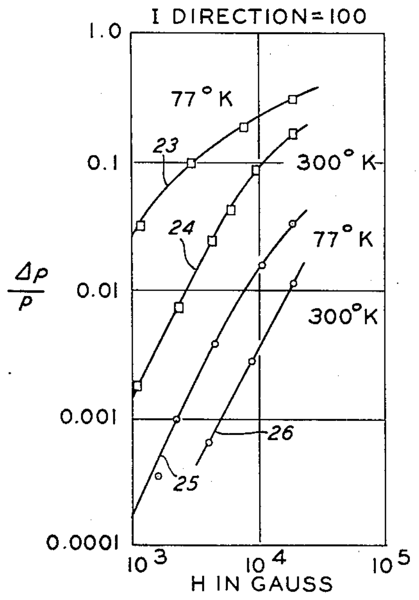
Figs. 4 and 5 illustrate the change of resistance of a P-type single germanium crystal with respect to variations in magnetic flux passing therethrough.
Figure 5:
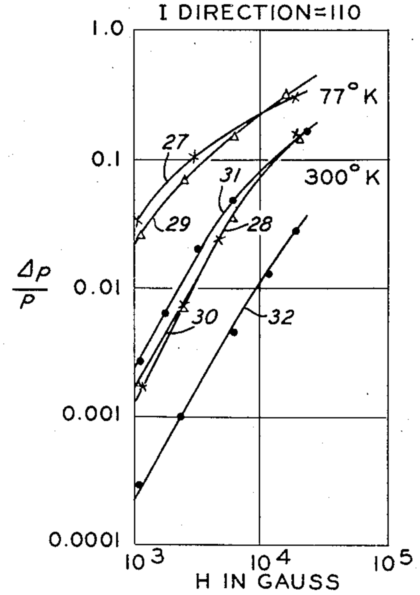

Figs. 4 and 5 show, similarly to Figs. 2 and 3, the change in resistance-magnetic field strength relation for bodies such as 11 and 12 of P-type germanium. For the device having the characteristics portrayed in Fig. 4, the crystal had its length parallel to the X or 100 axis, whereas the crystal having the characteristics depicted in Fig. 5 had its length parallel to the 110 direction. For curves 23 and 24 of Fig. 4 the flux was in the Y or 010 direction, and for curves 25 and 26, the magnetic flux was in the X or 100 direction. Curves 27 and 28 in Fig. 5 show the characteristics when the magnetic flux was in the Z or 001 direction, curves 29 and 30 when the flux was in the X [—Y] or 1$\bar{1}$0 direction and curves 31 and 32 for the case when the magnetic flux was in the 110 direction.

It will be noted from Figs. 2 to 5 inclusive that the change in resistance with change in magnetic field strength varies with the orientation of the body relative to the magnetic field and that, for an N-type body the largest changes of resistance obtain when the magnetic field is parallel to the length of the crystal and for a P-type body the largest changes occur when the field is normal to the length of the crystal. It will be noted also that over a wide range of field strengths, the change in resistance with change in field is substantially uniform. Specifically, as is indicated by these figures, with a fixed current passing through the crystal, the increment in voltage across the body due to its increased resistance because of the magnetic field is substantially proportional to the square of the magnetic field strength.

Figure 10:
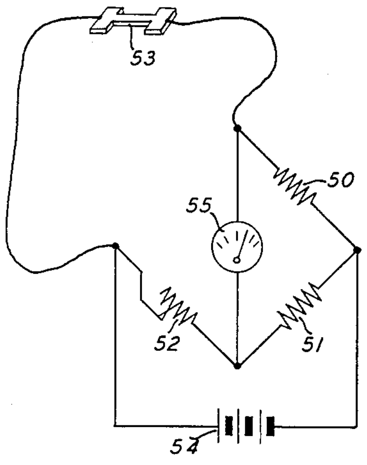
Fig. 10 is a circuit diagram illustrating one embodiment of this invention, particularly suitable for use as a flux meter.

A suitable circuit for a flux meter illustrative of one embodiment of this invention is shown in Fig. 10 and comprises the single crystal germanium body 53, such as the body 11 or 12 in Fig. 1, which constitutes one arm of a Wheatstone bridge, the other arms being defined by resistors 50, 51 and 52. A direct-current source 54 is connected across one pair of conjugate points of the bridge and a meter 55 is connected across the other two conjugate points. The bridge is initially balanced and the germanium body 53 is then inserted into the magnetic field to be measured and the bridge again balanced by adjustment of the resistor 52. The amount of change in the resistor 52 requisite to rebalance the bridge is a measure of the change in resistance of the germanium body 53 due to the magnetic field and thus of the magnetic field strength.

Figure 11:
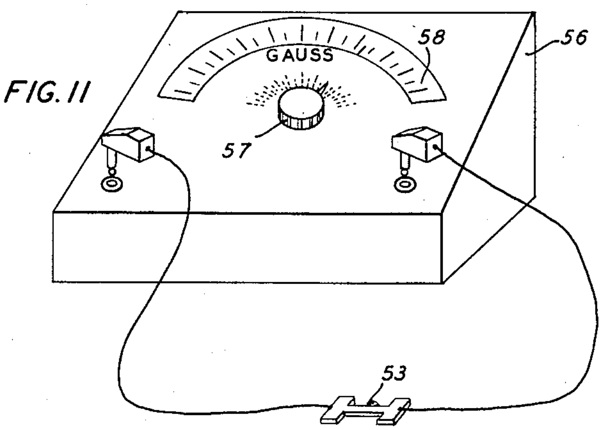
Fig. 11 illustrates a flux meter including the circuit of Fig. 10.

Components of the circuit of Fig. 10 may be mounted in a housing 56 as illustrated in Fig. 11 having thereon a dial 57 associated with the resistor 52 and calibrated to indicate the change in this resistor requisite to rebalance the bridge. Alternatively, the meter 55 may have a scale 58 calibrated to indicate directly the strength of the field into which the germanium element 53 is inserted. The germanium element may be coupled to the circuit as by plugs 59 adapted to fit into jacks in the housing 56.

The relationship between change in resistance of the magnetoresistive element when inserted into a magnetic field and the direction of the field as indicated in Figs. 6 to 9, inclusive. In these figures the rectangular coordinate directions indicated on the several curves are the directions of the magnetic field and, as in the case of Figs. 2 to 5, inclusive, $$\frac{\delta\rho}{\rho}$$

is plotted against direction of the magnetic field.

Figure 6:
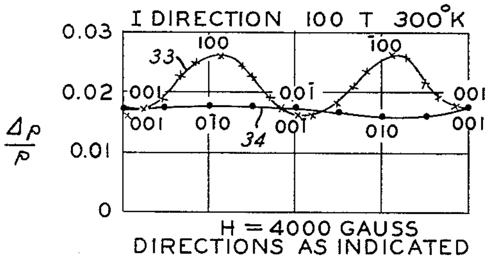
Figs. 6 and 7 are graphs showing change of resistance with respect to the position of a single N-type germanium crystal in a constant strength magnetic field.

Fig. 6 portrays relationships for a single N-type germanium crystal cut in the X or 100 direction, such as the crystal element 11 illustrated in Fig. 1. As indicated by curve 33 in Fig. 6, the change in resistance of the crystal element varies substantially sinusoidally, specifically proportionately to the square of the angle between the length axis of the crystal and the magnetic field, as the direction of the field is changed from the Z or 001 direction to the X or 100 direction, then to the —Z or $00\bar{1}$ direction, then to the —X or $\bar{1}00$ direction and back to the Z or 001 direction.

Curve 34 illustrates the change in resistance vs. magnetic field strength relation when the magnetic field direction is varied from the 001 or Z direction to the —Y or $0\bar{1}0$ direction then to the —Z or $00\bar{1}$ direction. It will be noted that line 34 approximates a rectilinear one, for the conditions represented thereby correspond in effect to placing the germanium element in a magnetic field perpendicular thereto and rotating the element about its length axis.

Figure 7:
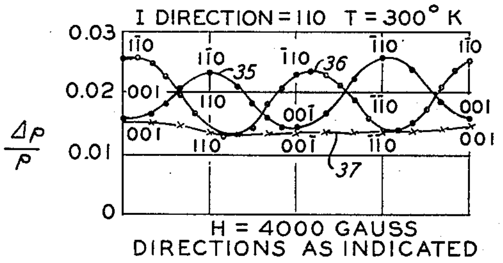

Fig. 7 discloses the relationship similar to Fig. 6 for a single crystal germanium body cut along the 110 axis, that is, a body such as illustrated at 12 in Fig. 1.

Figure 8:
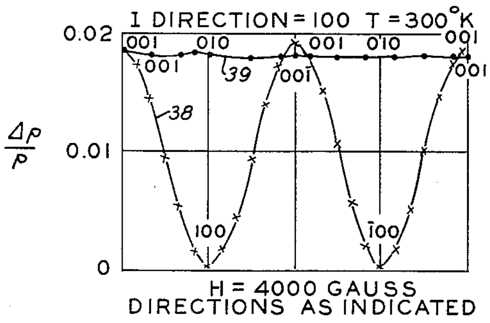
Figs. 8 and 9 are graphs showing change of resistance of a single P-type germanium crystal with respect to its position in a constant strength magnetic field.
Figure 9:
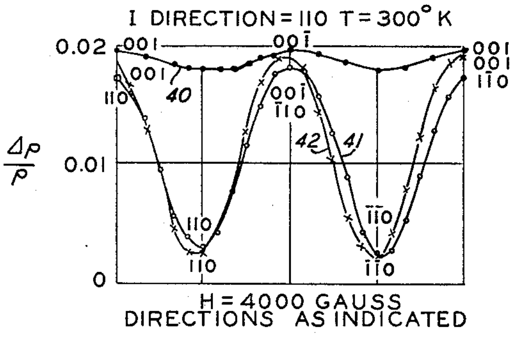

Figs. 8 and 9 illustrate the relationship between direction of field and change in resistance of the element for a single crystal element of P-type germanium, the crystal element represented by Fig. 8 being cut in the 100 direction and that having the characteristics portrayed in Fig. 9 being one cut in the 110 direction.

Figure 12:
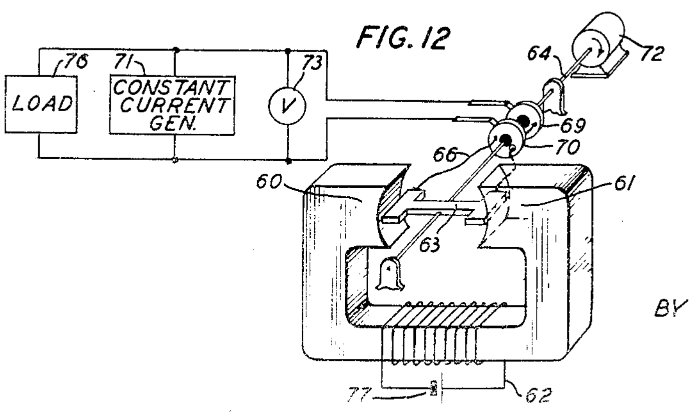
Fig. 12 illustrates an alternating voltage generator illustrative of another embodiment of this invention.

The characteristic of single crystal germanium elements depicted in Figs. 6 to 9, inclusive, may be utilized to advantage in voltage generators, one specific embodiment of which is illustrated in Fig. 12. As shown in this figure, the germanium element 63 is mounted for rotation about an axis 64 in a constant magnetic field produced between pole pieces 60 and 61 by a coil 62 energized from a suitable source 77. Rotation of the element 63 may be effected by a suitable motor 72. The ends of the single crystal germanium element 63 are connected as shown to slip rings 69 and 70. Across these rings are connected a constant current source 71 and a load 76, the voltage across the slip rings being measurable by a voltmeter 73. As the crystal element 63 is rotated the voltage appearing across the load 76 will vary in the manners illustrated in Figs. 6 to 9, inclusive.

Although specific embodiments of the invention have been shown and described it will be understood that they are but illustrative and that various modifications may be made therein without departing from the spirit and scope of this invention.

What is claimed is:

1. In a device comprising a magnetoresistive element insertable into a magnetice field, the combination wherein the magnetoresistive element is a single crystal body of semiconductive material and which comprises a pair of connections to said body at points spaced along a crystal axis of said body.

2. In a device comprising a magnetoresistive element insertable into a magnetic field, the combination wherein the magnetoresistive element is an elongated single crystal body of germanium having its longitudinal axis parallel to a crystal axis and which comprises a pair of electrical terminals at opposite ends of said body.

3. A magnetoresistive device comprising a single crystal body of germanium having a thin elongated portion the longitudinal axis of which is parallel to a crystal axis, electrical terminals at opposite ends of said portion, and means for establishing a constant current flow between said terminals.

4. A magnetoresistive device in accordance with claim 3 wherein said body is of N conductivity type germanium.

5. A magnetoresistive device in accordance with claim 3 wherein said body is of P conductivity type germanium.

6. A magnetoresistive device in accordance with claim 3 wherein said longitudinal axis is parallel to the 100 crystal axis.

7. The method of measuring the strength of a magnetic field which comprises inserting a single crystal body of semi-conductive material in the field with a crystal axis of the body parallel to the field, passing a constant current through the body in the direction parallel to said axis, and measuring the voltage drop between two points on said body spaced along said axis.

GERALD L. PEARSON.

References Cited in the file of this patent

UNITED STATES PATENTS

| Number | Name | Date |
|---|---|---|
| 2,260,589 | Smith | Oct. 28, 1941 |
| 2,335,117 | Harrison | Nov. 23, 1943 |
| 2,599,550 | Fraser | June 10, 1952 |

OTHER REFERENCES

Physical Review, vol. 71, 1947 p. 471, article by Dunlap.